US011632331B2

(12) United States Patent
Kimura et al.

(10) Patent No.: US 11,632,331 B2
(45) Date of Patent: Apr. 18, 2023

(54) LOAD DISTRIBUTION SYSTEM AND LOAD DISTRIBUTION METHOD

(71) Applicant: Nippon Telegraph and Telephone Corporation, Tokyo (JP)

(72) Inventors: Akihiro Kimura, Tokyo (JP); Shinya Kawano, Tokyo (JP); Hideo Tsuchiya, Tokyo (JP); Akihiro Okada, Tokyo (JP); Katsuma Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 11 days.

(21) Appl. No.: 17/265,991

(22) PCT Filed: Aug. 6, 2019

(86) PCT No.: PCT/JP2019/030813
§ 371 (c)(1),
(2) Date: Feb. 4, 2021

(87) PCT Pub. No.: WO2020/031996
PCT Pub. Date: Feb. 13, 2020

(65) Prior Publication Data
US 2021/0297357 A1    Sep. 23, 2021

(30) Foreign Application Priority Data
Aug. 7, 2018 (JP) .............................. JP2018-148940

(51) Int. Cl.
*G06F 15/16* (2006.01)
*H04L 47/2441* (2022.01)
(Continued)

(52) U.S. Cl.
CPC ........ *H04L 47/2441* (2013.01); *H04L 47/122* (2013.01); *H04L 47/125* (2013.01); *H04L 47/2483* (2013.01)

(58) Field of Classification Search
CPC . H04L 47/2441; H04L 47/122; H04L 47/125; H04L 47/2483; H04L 47/24; H04L 47/41; H04L 47/628
See application file for complete search history.

(56) References Cited

U.S. PATENT DOCUMENTS

2008/0114892 A1 * 5/2008 Bruno ................. H04L 47/2441
                                                  709/234
2008/0192692 A1 * 8/2008 Chari ...................... H04L 47/31
                                                  370/331
(Continued)

FOREIGN PATENT DOCUMENTS

JP          2004-350078         12/2004

OTHER PUBLICATIONS

S. Selvan and S. Ramakrishnan, "A Novel Wavelet Packet Transform Based Feature Extraction Algorithm for Image Texture Classification," TENCON 2005—2005 IEEE Region 10 Conference, 2005, pp. 1-4 (Year: 2005).*

(Continued)

*Primary Examiner* — Oscar A Louie
*Assistant Examiner* — Messeret F Gebre
(74) *Attorney, Agent, or Firm* — Fish & Richardson P.C.

(57) ABSTRACT

A storage unit configured to store information regarding flow characteristics indicating whether a flow constituted by a packet is a flow having a tendency to have a large number of short packets or a flow having a tendency to have a large number of long packets in association with destination information of the packet, a determination unit configured to, in a case where an input port receives a packet, determine flow characteristics of a flow constituted by the packet on the basis of the storage unit, and an output unit configured to output the packet received by the input port to a packet transfer apparatus in a load state indicating that a load due to the flow of the flow characteristics is light among a
(Continued)

plurality of packet transfer apparatuses according to the flow characteristics determined by the determination unit are provided.

6 Claims, 10 Drawing Sheets

(51) Int. Cl.
*H04L 47/122* (2022.01)
*H04L 47/125* (2022.01)
*H04L 47/2483* (2022.01)

(56) References Cited

U.S. PATENT DOCUMENTS

| | | | |
|---|---|---|---|
| 2010/0034109 A1* | 2/2010 | Shomura | H04L 41/142 370/252 |
| 2020/0014619 A1* | 1/2020 | Shelar | H04L 45/14 |

OTHER PUBLICATIONS

Liu, F., & Wei, L. (2006). A polyclonal selection clustering for packet classification Retrieved from https://dialog.proquest.com/professional/docview/832649571?accountid=131444 (Year: 2006).*

Y. Liu, D. Xu, Z. Mu and J. Qin, "Efficient Hybrid Packet Classification in Traffic Control System Using Network Processors," 2009 International Conference on Advanced Computer Control, 2009, pp. 57-61 (Year: 2009).*

Kimura et al., "A Loadbalancing Method of vCPE Server using Flow Characteristics," Proceedings of the 2018 IEICE General Conference, Mar. 20, 2018, p. 90, 3 pages (with English Translation).

* cited by examiner

| DESTINATION IP ADDRESS | DESTINATION PORT | COUNTER FOR FLOW CHARACTERISTICS | | SCORE (A−B)÷(A+B) |
|---|---|---|---|---|
| | | SHORT (A) | LONG (B) | |
| 10.0.0.10 | 5004 | 1000 | 0 | 1 |
| 20.0.0.15 | 443 | 490 | 510 | −0.02 |
| 30.0.0.20 | 443 | 500 | 500 | 0 |
| ⋮ | ⋮ | ⋮ | ⋮ | ⋮ |

Fig. 3

| DESTINATION NETWORK | SUBNET MASK | LIST OF GATEWAYS | OUTPUT PORT INFORMATION | LOAD STATE OF AMOUNT OF DATA (bps) | LOAD STATE OF NUMBER OF PACKETS (pps) |
|---|---|---|---|---|---|
| default | - | 192.168.1.0 | eth0 | 0 | 1 |
|  |  | 192.168.1.1 | eth1 | 0 | 0 |
|  |  | 192.168.1.2 | eth2 | 1 | 0 |
| 10.0.0.0 | 255.255.255.0 | 192.168.1.3 | eth3 | 0 | 1 |
| ... | ... | ... | ... | ... | ... |

PATH INFORMATION (columns: OUTPUT PORT INFORMATION, LOAD STATE OF AMOUNT OF DATA, LOAD STATE OF NUMBER OF PACKETS)

Fig. 4

| DESTINATION IP ADDRESS | DESTINATION PORT | COUNTER FOR FLOW CHARACTERISTICS ||||||| SCORE $\{(A-B) \times C + (D-E) \times F + (G-H) \times 1\}$ $\div \{(A+B) \times C + (D+E) \times F + (G+H) \times 1\}$ |
| | | ZERO TO ONE MONTH AGO WEIGHTING FACTOR 10 (C) || ONE TO TWO MONTHS AGO WEIGHTING FACTOR 5 (F) || TWO TO THREE MONTHS AGO WEIGHTING FACTOR 1 (I) || |
| | | SHORT (A) | LONG (B) | SHORT (D) | LONG (E) | SHORT (G) | LONG (H) | |
| 10.0.0.10 | 5004 | 1000 | 0 | 1000 | 0 | 1000 | 0 | 1 |
| 20.0.0.15 | 443 | 1000 | 0 | 0 | 1000 | 0 | 1000 | 0.25 |
| ... | ... | ... | ... | ... | ... | ... | ... | ... |

Fig. 9

LOAD DISTRIBUTION SYSTEM AND LOAD DISTRIBUTION METHOD

CROSS-REFERENCE TO RELATED APPLICATIONS

This application is a National Stage application under 35 U.S.C. § 371 of International Application No. PCT/JP2019/030813, having an International Filing Date of Aug. 6, 2019, which claims priority to Japanese Application Serial No. 2018-148940, filed on Aug. 7, 2018. The disclosure of the prior application is considered part of the disclosure of this application, and is incorporated in its entirety into this application.

TECHNICAL FIELD

The present invention relates to a load balancing system and a load balancing method.

BACKGROUND ART

A technology for balancing loads of packet transfer apparatuses such as routers has been known. For example, a technology for balancing loads of packet transfer apparatuses by preparing, as transfer destinations of packets, a plurality of packet transfer apparatuses and a plurality of transfer paths and equally applying traffic to these transfer paths has been known. A technology called Equal Cost Multi Path (ECMP) or ECMP routing has been known as such load balancing technologies. The ECMP is a load balancing technology for equally applying the traffic to the transfer paths at equal cost among the plurality of transfer paths.

A technology for monitoring an output buffer of an output physical port of the packet transfer apparatus and switching the transfer paths when the amount of usage of the output buffer or a packet flow exceeds a threshold in the load balancing system using the ECMP has been known (for example, PTL 1).

As an index of a transfer capacity in the packet transfer apparatus, there are a transfer capacity for the amount of data expressed by bits per second (bps) and a transfer capacity for the number of packets expressed by packets per second (pps). These transfer capacities have an upper limit unique to the packet transfer apparatus. For example, when the packet transfer apparatus is achieved by a network virtualization technology, bps may be limited by a line rate of a physical Network Interface Card (NIC), and pps may be limited by a packet processing speed of software such as an Operating System (OS) or an application.

In the ECMP, flow characteristics, that is, whether a flow is a long packet-centered flow or a short packet-centered flow, is not considered. Accordingly, in a case where there is a deviation in packet length transferred by the packet transfer apparatus, the transfer capacity of the packet transfer apparatus may not be available at the maximum. Here, the flow refers to the packets (traffic) or a packet group of which flow information is the same. The flow information is specified by header information included in the packet, and refers to, for example, 5-tuple (transmission source Internet Protocol (IP) address, a destination IP address, a transmission source port number, a destination port number, or a protocol type).

For example, traffic of a moving image or the like has properties having a large number of long packets. Thus, when the traffic of the moving image or the like is concentrated, the transfer capacity for the amount of data is lacked, whereas enough transfer capacity is retained for the number of packets. Meanwhile, for example, traffic of Voice over Internet Protocol (VoIP), telemetering, or the like has properties having a large number of short packets. Thus, when the traffic of the VoIP, the telemetering, or the like is concentrated, enough transfer capacity for the amount of data is retained, whereas the transfer capacity for the number of packets is lacked.

There is a technology for balancing the loads in consideration of the flow characteristics. For example, there is a load balancing method of performing load balancing of a server that hosts a virtualized CPE (vCPE) that virtualizes some functions of customer-premises equipment on the basis of a load state and a packet length of the flow in terms of the bps and the pps of the server (for example, NPL 1).

CITATION LIST

Patent Literature

PTL 1: JP 2004-350078 A

Non Patent Literature

NPL 1: Kimura Akihiro, Miyamoto Katsuma, Kawano Shinya, Tsuchiya Hideo, and Okada Akihiro, "Load balancing method of vCPE Server based on flow characteristics", Proceedings of the 2018 IEICE General Conference, Vol. 2018 Communication (2), p. 90 b-6-90

SUMMARY OF THE INVENTION

Technical Problem

When the load balancing is performed on the basis of the flow characteristics, it is necessary to efficiently and accurately determine the flow characteristics.

An embodiment of the present invention has been made in view of the above points, and an object thereof is to efficiently and accurately determine flow characteristics.

Means for Solving the Problem

To achieve the object, a load balancing system according to an embodiment of the present invention includes a storage unit configured to store information regarding flow characteristics indicating whether a flow constituted by a packet is a flow having a tendency to have a large number of short packets or a flow having a tendency to have a large number of long packets in association with destination information of the packet, a determination unit configured to, in a case where an input port receives a packet, determine flow characteristics of a flow constituted by the packet on the basis the storage unit, and an output unit configured to output the packet received by the input port to a packet transfer apparatus in a load state indicating that a load due to the flow of the flow characteristics is light among a plurality of packet transfer apparatuses according to the flow characteristics determined by the determination unit.

Effects of the Invention

An object of the disclosure is to efficiently and accurately determine flow characteristics.

BRIEF DESCRIPTION OF DRAWINGS

FIG. 3 is a diagram illustrating an example of a database according to Example 1.

FIG. 4 is a diagram illustrating an example of an ECMP path table according to Example 1.

FIG. 9 is a diagram illustrating an example of a database according to Example 2.

DESCRIPTION OF EMBODIMENTS

Hereinafter, embodiments according to the present invention will be described. In the embodiments of the present invention, a load balancing system 1 for performing load balancing according to flow characteristics will be described. Hereinafter, it is assumed that a "high bps flow" indicating a flow of a large number of long packets and a "high pps flow" indicating a flow of a large number of short packets are included in the flow characteristics.

Figure 1:
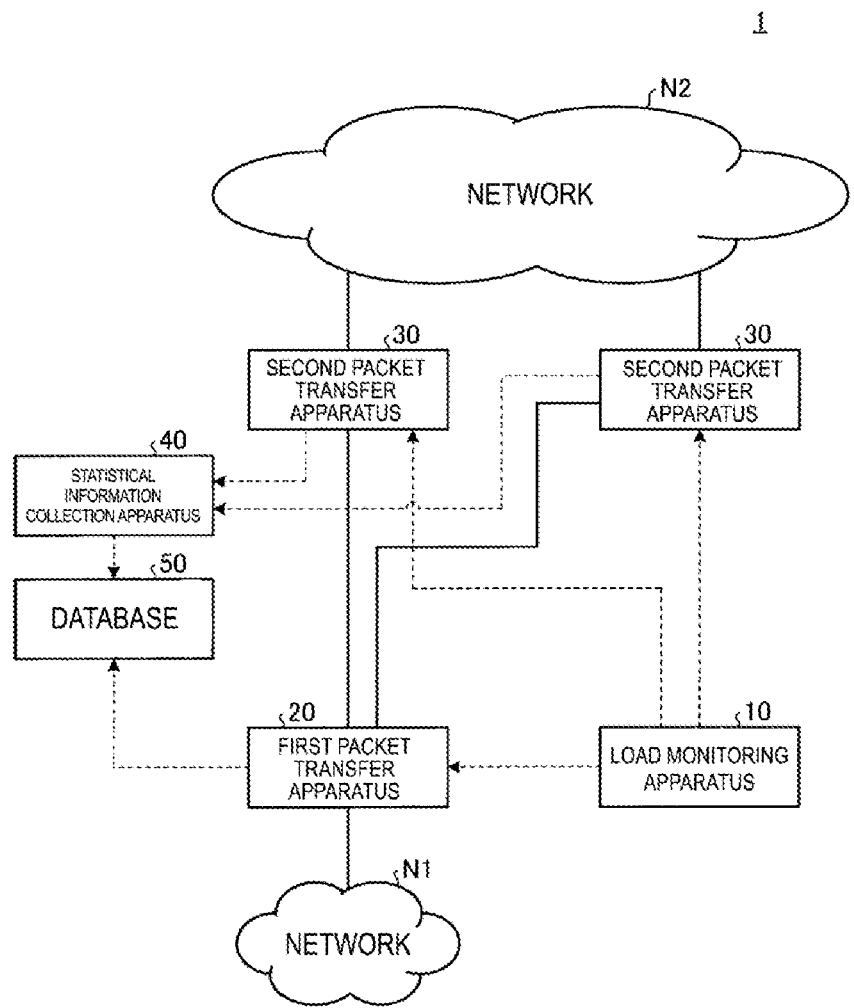
FIG. 1 is a diagram illustrating an example of an overall configuration of a load balancing system according to an embodiment of the present invention.

Overall Configuration First, an overall configuration of the load balancing system 1 according to the embodiments of the present invention will be described with reference to FIG. 1. FIG. 1 is a diagram illustrating an example of the overall configuration of the load balancing system 1 according to the embodiments of the present invention.

As illustrated in FIG. 1, the load balancing system 1 according to the embodiments of the present invention includes a load monitoring apparatus 10, a first packet transfer apparatus 20, a second packet transfer apparatuses 30, a statistical information collection apparatus 40, and a database 50.

The load monitoring apparatus 10 is, for example, a computer or a computer system, and monitors a traffic flow of the second packet transfer apparatus 30 that is a load balancing target. When the traffic flow of the second packet transfer apparatus 30 exceeds a predetermined threshold (or falls below the predetermined threshold), the load monitoring apparatus 10 transmits a command indicating that load balancing is to be implemented (or the load balancing is to be canceled) to the first packet transfer apparatus 20.

The first packet transfer apparatus 20 is, for example, a router, and transfers a packet from a network N1 to the second packet transfer apparatus 30. At this time, the first packet transfer apparatus 20 transfers the corresponding packet to the second packet transfer apparatus 30 corresponding to the flow characteristics among a plurality of second packet transfer apparatuses 30 while referring to a predetermined table used for the load balancing.

The first packet transfer apparatus 20 changes the predetermined table used for the load balancing according to a command from the load monitoring apparatus 10.

The second packet transfer apparatus 30 is, for example, a router, and transfers the packet transferred from the first packet transfer apparatus 20 to a network N2. Hereinafter, when the plurality of second packet transfer apparatuses 30 are distinguished from each other, these packet transfer apparatuses are referred to as a "second packet transfer apparatus 30-1", a "second packet transfer apparatus 30-2", and the like.

The statistical information collection apparatus 40 receives a flow characteristic notification notifying the flow characteristics from the second packet transfer apparatus 30, and updates the database 50. The database 50 stores statistical information regarding the flow characteristics.

Note that, the configuration of the load balancing system 1 illustrated in FIG. 1 is an example, and other configurations may be employed. For example, the first packet transfer apparatus 20 and the second packet transfer apparatus 30 may be a virtual router built on a computer or the like by using a network virtualization technology.

Example 1

Hereinafter, Example 1 of the load balancing system 1 according to the embodiments of the present invention will be described below.

Functional Configuration

Figure 2:
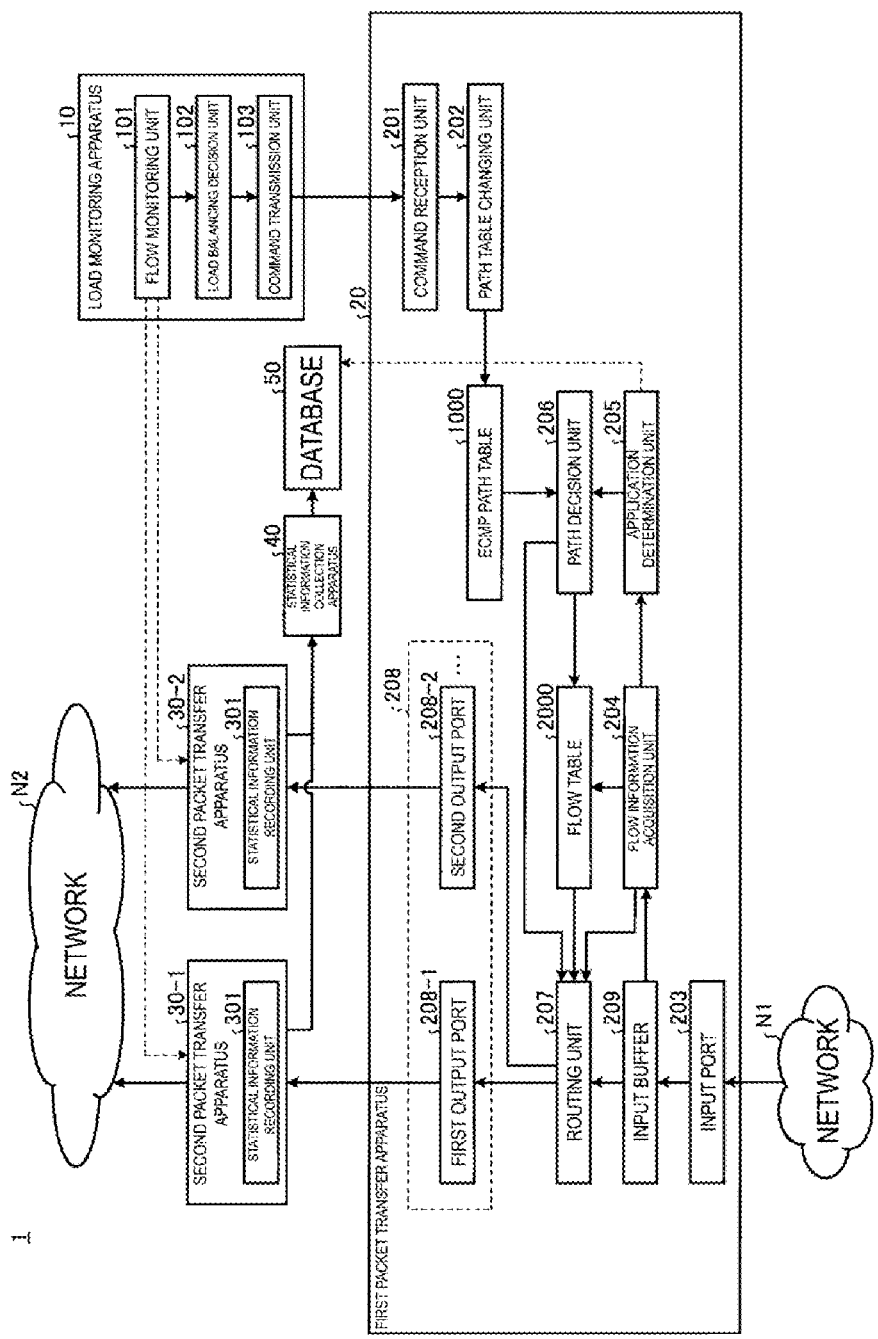
FIG. 2 is a diagram illustrating an example of a functional configuration of the load balancing system according to Example 1.

First, a functional configuration of the load balancing system 1 according to Example 1 will be described with reference to FIG. 2. FIG. 2 is a diagram illustrating an example of the functional configuration of the load balancing system 1 according to Example 1.

As illustrated in FIG. 2, the load monitoring apparatus 10 according to Example 1 includes a flow monitoring unit 101, a load balancing decision unit 102, and a command transmission unit 103.

The flow monitoring unit 101 monitors the traffic flows of these second packet transfer apparatuses 30 for the amount of data (bps) and the number of packets (pps) by using the statistical information of the second packet transfer apparatus 30. That is, the flow monitoring unit 101 obtains the amount of data (bps) and the number of packets (pps) as a monitoring result for each second packet transfer apparatus 30. Hereinafter, the obtained amount of data (bps), which is the monitoring result, is referred to as a "bps result value", and the obtained number of packets (pps), which is the monitoring result, is referred to as a "pps result value".

The load balancing decision unit 102 decides whether to implement or cancel the load balancing. That is, the load balancing decision unit 102 determines whether the bps result value exceeds or falls below a preset bps threshold. Similarly, the load balancing decision unit 102 determines whether the pps result value exceeds or falls below a preset pps threshold.

When it is determined that the bps result value exceeds the bps threshold, the load balancing decision unit 102 decides to implement the load balancing. Meanwhile, when it is determined that the bps result value falls below the bps threshold, the load balancing decision unit 102 decides to cancel the load balancing.

Similarly, when it is determined that the pps result value exceeds the pps threshold, the load balancing decision unit 102 decides to implement the load balancing. Meanwhile, when it is determined that the pps result value falls below the pps threshold, the load balancing decision unit 102 decides to cancel the load balancing.

When the load balancing decision unit 102 decides to implement the load balancing or decides to cancel the load balancing, the command transmission unit 103 transmits a predetermined command to the first packet transfer apparatus 20.

Here, the command includes a "threshold type", a "command type", and "identification information of a target apparatus". The "threshold type" is a type of the threshold that the monitoring result exceeds or a type of the threshold that the monitoring result falls below, and information indicating the bps threshold or information indicating the pps threshold is set. Information indicating whether to implement or cancel the load balancing is set to the "command type". The "identification information of the target apparatus" is identification information of the second packet transfer apparatus 30 for which the monitoring result exceeds the threshold or falls below the threshold, and, for example, an IP address of the second packet transfer apparatus 30 is set to the "identification information of the target apparatus". However, for example, an ID of the second packet transfer apparatus 30, a Media Access Control (MAC) address, and a hostname in addition to the IP address may be set to the "identification information of the target apparatus".

As illustrated in FIG. 2, the second packet transfer apparatus 30 according to Example 1 includes a statistical information recording unit 301. When the second packet transfer apparatus 30 completes the flow transfer, the statistical information recording unit 301 notifies the statistical information collection apparatus 40 of flow information (5-tuple) and flow characteristics of the flow by using the flow characteristic notification.

The statistical information collection apparatus 40 specifies a flow on the basis of the flow characteristic notification. In a case where statistical information regarding characteristics of the specified flow is registered in the database 50, the statistical information collection apparatus 40 updates the statistical information, and, in a case where the statistical information is not resisted, the statistical information collection apparatus 40 creates a record on the basis of the flow characteristic notification and adds the created record to the database 50.

FIG. 3 is a diagram illustrating an example of the database 50 according to Example 1. As illustrated in FIG. 3, the database 50 stores the flow characteristic statistical information as the record. The flow characteristic statistical information includes a "destination IP address", a "destination port", a "counter for flow characteristics", and a "score".

An IP address of a destination of the packet is set to the destination IP address. An output port of the packet is set to the "destination port". The "counter for flow characteristics" includes two counters of a "short (A)" and a "long (B)". The number of short packet-centered flows is set to the short counter, and the number of long packet-centered flows is set to the long counter.

A normalized value obtained by dividing a value (A−B) of a difference obtained by subtracting a value (B) of the long counter from a value (A) of the short counter by a total value (A+B) of both the counters is set to the "score". When the "score" is a positive value, the characteristics of the flow identified by the "destination IP address" and the "destination port" are of the short packet-centered flow, and when the "score" is a negative value, the characteristics of the flow identified by the "destination IP address" and the "destination port" are of the long packet-centered flow.

In the example shown in FIG. 3, for a flow in which the "destination IP address" is "10.0.0.10" and the "destination port" is "5004", the number of short packet-centered flows is "1000", the number of long packet-centered flows is "0", and the "score" is "1".

The statistical information collection apparatus 40 adds "1" to the short counter when the flow characteristics included in the flow characteristic notification are the "high pps flow", and adds "1" to the long counter when the flow characteristics included in the flow characteristic notification are the "high bps flow". When the record is added, the statistical information collection apparatus 40 sets the short counter or the long counter to "1" on the basis of the flow characteristics included in the flow characteristic notification, and sets the other counter to "0".

It is important to reduce the number of records to increase a search speed of the database 50. The number of records is enormous when the record is created by a combination of all 5-tuples, and thus, the statistical information collection apparatus 40 creates the record by using only destination information of the "destination IP address" and the "destination port".

When the record is created with only the destination information, the number of records can be reduced. However, determination accuracy of the flow characteristics decreases compared to a case in which the record is created with the 5-tuple. For example, even in a case where the destination information is the same, when the flow characteristics differ depending on a transmission source, the determination accuracy of the flow characteristics decreases. Thus, the statistical information collection apparatus 40 replaces the record such that a record having high determination accuracy of the flow characteristics is preferentially left in the database 50 while the number of records is reduced by limiting the key to creating the record to the destination information.

That is, when the record needs to be replaced with the database 50 being filled, the statistical information collection apparatus 40 selects the record to be deleted on the basis of an absolute value a of the "score". The statistical information collection apparatus 40 first selects a record of which a=0. When there is no record of which a=0, the statistical information collection apparatus 40 selects a record on the basis of Least Recently Used (LRU) in which a record is deleted in order in which the most recent frequency of use is low after w/a is added to an elapsed time since the record is last referred to. w is any positive number.

As stated above, the statistical information collection apparatus 40 applies the LRU by changing the elapsed time on the basis of a such that a record of which a is small, that is, a record having a small deviation in flow characteristics and a low determination accuracy of the flow characteristics is disadvantageously evaluated by the LRU. Thus, the statistical information collection apparatus 40 can leave the record having high determination accuracy of the flow characteristics in the database 50.

Note that, the statistical information collection apparatus 40 and the database 50 may be included in, for example, the first packet transfer apparatus 20. The database 50 is realized by, for example, a random access memory (RAM), an auxiliary storage apparatus, a dedicated memory apparatus, or the like.

As illustrated in FIG. 2, the first packet transfer apparatus 20 according to Example 1 includes a command reception unit 201, a path table changing unit 202, an input port 203, a flow information acquisition unit 204, an application determination unit 205, a path decision unit 206, a routing unit 207, an output port 208, and an input buffer 209. Each of these functional units is achieved by processing of causing a CPU or the like to execute one or more programs installed in the first packet transfer apparatus 20.

The command reception unit 201 receives a command from the load monitoring apparatus 10. The path table changing unit 202 changes an ECMP path table 1000 according to the command received by the command reception unit 201. The ECMP path table 1000 is a table storing path information as entries. Note that, the ECMP path table 1000 is stored in, for example, an auxiliary storage apparatus, a dedicated memory apparatus, or the like. Details of the ECMP path table 1000 according to Example 1 are described below.

The input port 203 receives a packet from the network N1. The input port 203 stores the received packet in the input buffer 209. Note that, the input buffer 209 is a storage region for temporarily storing the received packet, and is realized, for example, by a RAM, an auxiliary storage apparatus, a dedicated memory apparatus, or the like.

The flow information acquisition unit 204 generates a hash value from the flow information (for example, 5-tuple) of the packet stored in the input buffer 209. The flow information acquisition unit 204 determines whether there is an entry including a hash value matching the generated hash value while referring to a flow table 2000. The flow table 2000 is a table storing flow transfer information in which the hash value and information (output port information) indicating the output port 208 are associated with each other as entries. The output port information is information for specifying any one output port 208 of the plurality of output ports 208. Note that, the flow table 2000 is stored in, for example, a RAM, an auxiliary storage apparatus, a dedicated memory apparatus, or the like.

When it is determined that there is the corresponding entry, the flow information acquisition unit 204 notifies the routing unit 207 of the entry. Meanwhile, when it is determined that there is no corresponding entry, the flow information acquisition unit 204 determines the corresponding packet to be a packet of a new flow, and notifies the application determination unit 205 that there is no corresponding entry. At this time, the flow information acquisition unit 204 notifies the application determination unit 205 of 5-tuple or L7 information of the corresponding packet (for example, header information of L7) and the hash value.

Note that, the entry (flow transfer information) stored in the flow table 2000 may be deleted (cleared) every predetermined time by, for example, the path decision unit 206 or the like.

The application determination unit 205 searches the database 50 using the destination information as the key according to the notification from the flow information acquisition unit 204, and specifies flow characteristics of the new flow. The application determination unit 205 specifies the new flow as a short packet-centered flow when the "score" is a positive value, and specifies the new flow as a long packet-centered flow when the "score" is a negative value. The application determination unit 205 notifies the path decision unit 206 of the specified flow characteristics. At this time, the application determination unit 205 notifies the path decision unit 206 of the 5-tuple, the flow characteristic, and the hash value.

The path decision unit 206 decides the output port 208 from the flow characteristics specified by the application determination unit 205 while referring to the ECMP path table 1000. The path decision unit 206 stores flow transfer information in which information indicating the decided output port 208 and the hash value are associated with each other in the flow table 2000. The path decision unit 206 notifies the routing unit 207 of the entry (flow transfer information) stored in the flow table 2000.

The routing unit 207 acquires the output port information included in the entry (flow transfer information) notified by the flow information acquisition unit 204 or the path decision unit 206. The routing unit 207 transmits the corresponding packet to the output port 208 indicated by the acquired output port information.

The output port 208 outputs the packet received from the routing unit 207. Here, the output port 208 is present, for example, for each second packet transfer apparatus 30. For example, the output port 208 includes an output port 208-1 corresponding to the second packet transfer apparatus 30-1 and an output port 208-2 corresponding to the second packet transfer apparatus 30-2. Note that, the output port 208 may be a physical port, or may be a logical port.

Here, the ECMP path table 1000 according to Example 1 will be described with reference to FIG. 4. FIG. 4 is a diagram showing an example of the ECMP path table 1000 according to Example 1.

As illustrated in FIG. 4, the path information is stored as the entry in the ECMP path table 1000 according to Example 1. The path information includes a "destination network", a "subnet mask", a "list of gateways", "output port information", a "load state of the amount of data (bps)", and a "load state of the number of packets (pps)".

An IP address of the network which is a transfer destination of the packet or default is set to the "destination network". A subnet mask corresponding to the destination network is set to the "subnet mask".

An IP address of the gateway (second packet transfer apparatus 30) corresponding to the destination network is set to the "list of gateways". Note that, IP addresses of one or more gateways for one destination network are set to the "list of gateways".

Information indicating the output port 208 for (the IP address of) each gateway set to the "list of gateways" is set to the "output port information".

In the example shown in FIG. 4, "eth0" indicating the output port 208-1 is associated with a gateway "192.168.1.0". This indicates that the packet is transmitted from the output port 208-1 when the packet is transmitted from the gateway "192.168.1.0."

Similarly, for example, "eth1" indicating the output port 208-2 is associated with a gateway "192.168.1.1". This indicates that the packet is transmitted from the output port 208-2 when the packet is transmitted from the gateway "192.168.1.1." The same applies to other gateways.

For (the IP address of) each gateway set to the "list of gateways", a load state of the amount of data (bps) in the gateway is set to the "load state of the amount of data (bps)". Here, in the example shown in FIG. 4, when "0" is set to the "load state of the amount of data (bps)", the load state of the amount of data (bps) in the corresponding gateway is a "low load". Meanwhile, when "1" is set to the "load state of the amount of data (bps)", the load state of the amount of data (bps) in the corresponding gateway is a "high load".

For (the IP address of) each gateway set to the "list of gateways", a load state of the number of packets (pps) in the gateway is set to the "load state of the number of packets (pps)". Here, in the example shown in FIG. 4, when "0" is set to the "load state of the number of packets (pps)", the load state of the number of packets (pps) in the corresponding gateway is a "low load". Meanwhile, when "1" is set to the "load state of the number of packets (pps)", the load state of the number of packets (pps) in the corresponding gateway is a "high load".

As stated above, path information including one or more gateways for the corresponding destination network; and the output port information and the load state for each gateway are stored in the ECMP path table 1000 according to Example 1 for each destination network.

As will be described below, in Example 1, the load balancing is performed such that in a case where the load state of each gateway (the second packet transfer apparatus 30) exceeds (or falls below) a threshold, the load state corresponding to the gateway is changed, and when the packet is transferred, the packet is transmitted from the gateway in the low load state according to the flow characteristics.

Change Processing of ECMP Path Table

Figure 5:
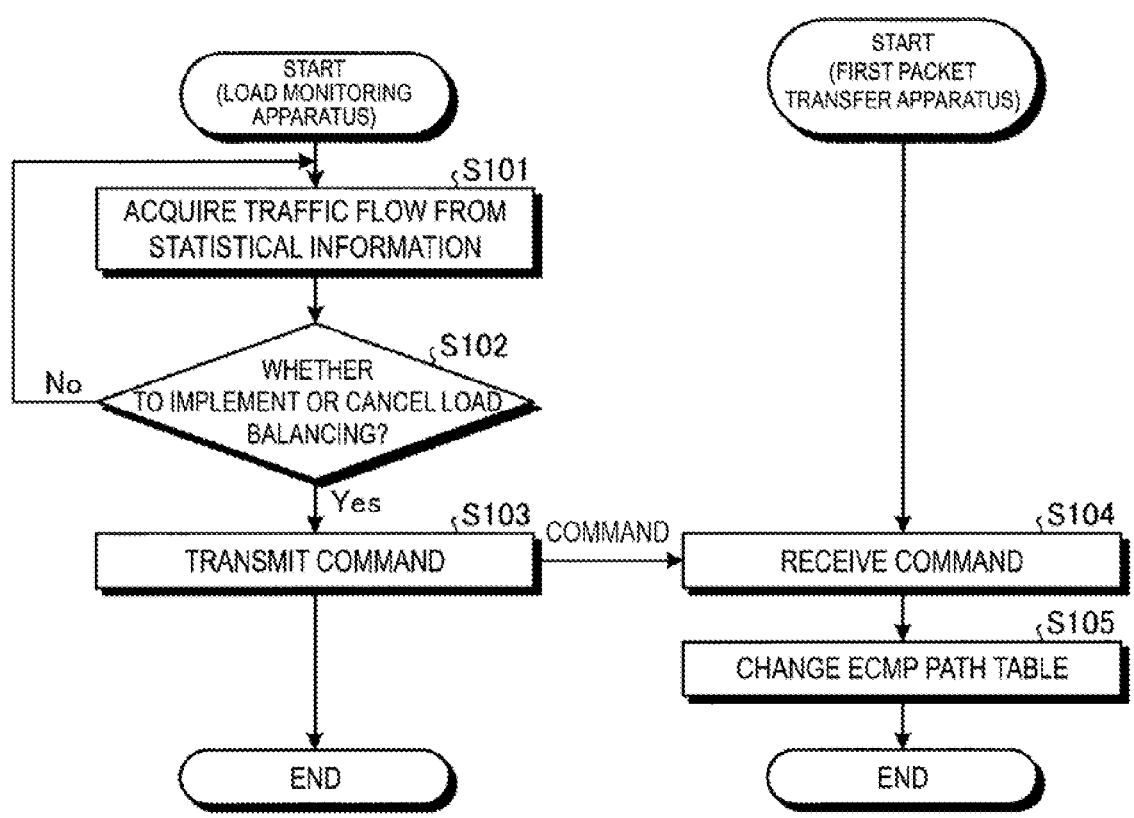
FIG. 5 is a diagram for describing an example of a flow of change processing of the ECMP path table according to Example 1.

Hereinafter, change processing of the ECMP path table 1000 according to Example 1 will be described with reference to FIG. 5. FIG. 5 is a diagram for describing an example of a flow of the change processing of the ECMP path table 1000 according to Example 1.

First, the flow monitoring unit 101 of the load monitoring apparatus 10 acquires the bps result value and the pps result value of the second packet transfer apparatus 30 from the statistical information of the second packet transfer apparatus 30 (step S101). Here, the flow monitoring unit 101 acquires the bps result value and the pps result value of each second packet transfer apparatus 30 every predetermined time, for example. Note that, the statistical information can be acquired using, for example, netstat or the like.

Subsequently, the load balancing decision unit 102 of the load monitoring apparatus 10 decides whether to implement or cancel the load balancing (step S102). That is, the load balancing decision unit 102 determines whether the bps result value exceeds or falls below the bps threshold. Similarly, the load balancing decision unit 102 determines whether the pps result value exceeds or falls below the pps threshold. Note that, as the bbs threshold and the pps threshold, the identical value may be decided for all the second packet transfer apparatuses 30 or a value may be decided for each of the second packet transfer apparatuses 30. Alternatively, for example, a value may be decided for each group by grouping one or more second packet transfer apparatuses 30 on a predetermined basis.

When it is determined that the bps result value exceeds the bps threshold, the load balancing decision unit 102 decides to implement the load balancing. Meanwhile, when it is determined that the bps result value falls below the bps threshold, the load balancing decision unit 102 decides to cancel the load balancing.

Similarly, when it is determined that the pps result value exceeds the pps threshold, the load balancing decision unit 102 decides to implement the load balancing. Meanwhile, when it is determined that the pps result value falls below the pps threshold, the load balancing decision unit 102 decides to cancel the load balancing.

When none of the implementation of the load balancing and the cancellation of the load balancing is decided in step S102, a step in the load monitoring apparatus 10 returns to step S101 described above.

Meanwhile, when at least one of the implementation of the load balancing or the cancellation of the load balancing is decided in step S102, the command transmission unit 103 of the load monitoring apparatus 10 transmits a predetermined command to the first packet transfer apparatus 20 (step S103).

The command reception unit 201 of the first packet transfer apparatus 20 receives the command from the load monitoring apparatus 10 (step S104).

Subsequently, the path table changing unit 202 of the first packet transfer apparatus 20 changes the ECMP path table 1000 according to the command received by the command reception unit 201 (step S105).

Specifically, for example, when a notification indicating that the "bps threshold" is set to the "threshold type", the "implementation of the load balancing" is set to the "command type", and "192.168.1.0" is set to the "identification information of the target apparatus" is received, the path table changing unit 202 changes the "load state of the amount of data (bps)" to "1" for the gateway of which the IP address is "192.168.1.0" for each entry of the ECMP path table 1000.

Similarly, for example, when a notification indicating that the "bps threshold" is set to the "threshold type", the "cancellation of the load balancing" is set to the "command type", and "192.168.1.2" is set to the "identification information of the target apparatus" is received, the path table changing unit 202 changes the "load state of the amount of data (bps)" to "0" for the gateway of which the IP address is "192.168.1.2" for each entry of the ECMP path table 1000.

Similarly, for example, when a notification indicating that the "pps threshold" is set to the "threshold type", the "implementation of the load balancing" is set to the "command type", and "192.168.1.1" is set to the "identification information of the target apparatus" is received, the path table changing unit 202 changes the "load state of the number of packets (pps)" to "1" for the gateway of which the IP address is "192.168.1.1" for each entry of the ECMP path table 1000.

Similarly, for example, when a notification indicating that the "pps threshold" is set to the "threshold type", "the cancellation of the load balancing" is set to the "command type", and "192.168.1.0" is set to the "identification information of the target apparatus" is received, the path table changing unit 202 changes the "load state of the number of packets (pps)" to "0" for the gateway of which the IP address is "192.168.1.0" for each entry of the ECMP path table 1000.

As described above, when the bps result value or the pps result value of the second packet transfer apparatus 30 that is the load balancing target exceeds or falls below the threshold, the load balancing system 1 according to Example 1 changes the load state of the second packet transfer apparatus 30 in each entry stored in the ECMP path table 1000. Thus, the load state (the load state of the amount of data (bps) and the load state of the number of packets (pps)) of each second packet transfer apparatus 30 is managed by each entry stored in the ECMP path table 1000.

Packet Transfer Processing

Figure 6:
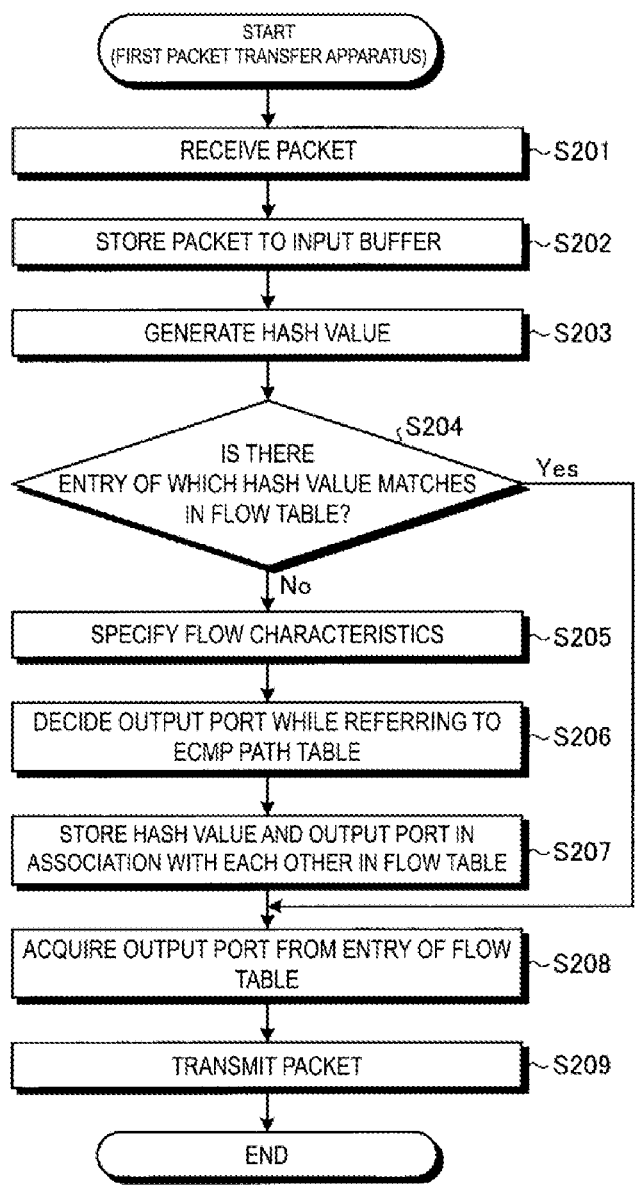
FIG. 6 is a diagram for describing an example of a flow of packet transfer processing according to Example 1.

Hereinafter, packet transfer processing according to Example 1 will be described with reference to FIG. 6. FIG. 6 is a diagram for describing an example of a flow of the packet transfer processing according to Example 1.

First, the input port 203 of the first packet transfer apparatus 20 receives the packet from the network N1 (step S201).

Subsequently, the input port 203 of the first packet transfer apparatus 20 stores the packet received in step S201 described above in the input buffer 209 (step S202).

Subsequently, the flow information acquisition unit 204 of the first packet transfer apparatus 20 generates the hash value from the flow information (for example, 5-tuple) of the packet stored in the input buffer 209 (step S203). Note that, any hash function can be used to generate the hash value.

Subsequently, the flow information acquisition unit 204 of the first packet transfer apparatus 20 determines whether the entry (flow transfer information) including a hash value matching the hash value generated in step S203 described above is stored in the flow table 2000 (step S204).

When it is determined that the corresponding entry is stored in the flow table 2000 in step S204, processing in the first packet transfer apparatus 20 proceeds to processing of step S208 to be described below.

Meanwhile, when it is determined that the corresponding entry is not stored in the flow table 2000 in step S204, the application determination unit 205 of the first packet transfer apparatus 20 specifies the flow characteristics of the corresponding packet by using the database 50 (step S205). That is, the application determination unit 205 specifies whether the flow characteristics of the flow of the corresponding packet are the "high bps flow" or the "high pps flow". The application determination unit 205 can specify the flow characteristics on the basis of whether the "score" corresponding to the flow of the packet is positive or negative.

Subsequently, the path decision unit 206 of the first packet transfer apparatus 20 decides the output port 208 from the flow characteristics specified in step S205 described above while referring to the ECMP path table 1000 (step S206). The path decision unit 206 decides the output port 208 by, for example, the following procedure of from S1 to S3.

S1) First, the path decision unit 206 searches the ECMP path table 1000 for the entry corresponding to a network address of the destination IP address included in the 5-tuple notified from the application determination unit 205. At this time, the path decision unit 206 searches for the entry by longest matching, for example. In a case where the entry corresponding to the corresponding network address is found, the path decision unit 206 refers to this entry. Meanwhile, in a case where the entry corresponding to the corresponding network address is not found, the path decision unit 206 refers to an entry in which "default" is set to the destination network.

S2) Subsequently, the path decision unit 206 searches for the gateway in the low load state from among the "list of gateways" included in the referred entry according to the flow characteristics.

For example, when the flow characteristics specified in step S205 described above is the "high bps flow", the path decision unit 206 searches for the gateway in which "0" is set to the "load state of the amount of data (bps)" among the "list of gateways" included in the corresponding entry from the top of the list.

Meanwhile, for example, when the flow characteristics specified in step S205 described above is the "high pps flow", the path decision unit 206 sequentially searches for the gateways in which "0" is set to the "load state of the number of packets (pps)" among the "list of gateways" included in the corresponding entry from the top of the list.

S3) The path decision unit 206 decides that the output port 208 indicated by the output port information corresponding to the gateway found in S2 described above is the output port 208 of the corresponding packet.

Note that, when the gateway is not found in S2 described above, the path decision unit 206 decides that the output port 208 indicated by the output port information corresponding to the gateway in the high load state is the output port 208 of the corresponding packet. For example, when there is no gateway in which the flow characteristics specified in step S205 described above are the "high bps flow" and "0" is set to the "load state of the amount of data (bps)", the path decision unit 206 decides that the output port 208 indicated by the output port information corresponding to the gateway in which "1" is set to the "load state of the amount of data (bps)" is the output port 208 of the corresponding packet.

Similarly, for example, when the flow characteristics specified in step S205 described above are the "high pps flow" and there is no gateway in which "0" is set to the "load state of the number of packets (pps)", the path decision unit 206 decides that the output port 208 indicated by the output port information corresponding to the gateway in which "1" is set to the "load state of the number of packets (pps)" is the output port 208 of the corresponding packet.

Here, when the output port 208 for the identical destination network is requested to be changed by a round-robin method, the path decision unit 206 may move information on the gateway corresponding to the decided output port 208 to the end of the "list of gateways". For example, in the ECMP path table 1000 shown in FIG. 4, when the output port information "eth0" of the gateway "192.168.1.0" of the destination network "default" is decided to the output port 208, this gateway "192.168.1.0" may be moved to the end (that is, after the gateway "192.168.1.2") of the list. Accordingly, further load balancing can be expected by changing the output port 208 for the identical destination network by the round-robin method.

Subsequently, the path decision unit 206 of the first packet transfer apparatus 20 stores the flow transfer information in which the hash value notified from the application determination unit 205 and the information (output port information) indicating the output port 208 decided in step S206 described above are associated with each other in the flow table 2000 (step S207).

The routing unit 207 of the first packet transfer apparatus 20 acquires the output port information from the corresponding entry (the entry for which it is determined that the hash values match in step S204 described above or the entry stored in step S207 described above) (step S208). The routing unit 207 transmits the corresponding packet to the output port 208 indicated by the acquired output port information.

The output port 208 of the first packet transfer apparatus 20 transmits the packet received from the routing unit 207 (step S209).

Registration Processing of Flow Characteristics

Figure 7:
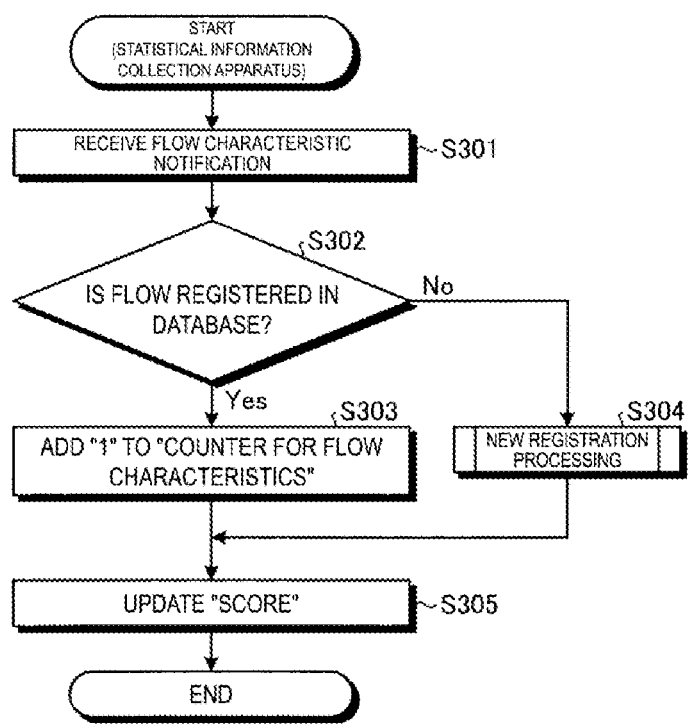
FIG. 7 is a diagram for describing an example of a flow of registration processing of flow characteristics according to Example 1.

Hereinafter, registration processing of the flow characteristics according to Example 1 will be described with reference to FIG. 7. FIG. 7 is a diagram for describing an example of a flow of the registration processing of the flow characteristics according to Example 1.

First, the statistical information collection apparatus 40 receives the flow characteristic notification from the second packet transfer apparatus 30 (step S301).

Subsequently, the statistical information collection apparatus 40 determines whether the flow specified by the destination information included in the flow characteristic notification is registered in the database 50 (step S302).

When it is determined that the corresponding flow is registered in the database 50 in step S302, the statistical information collection apparatus 40 adds "1" to the "counter for flow characteristics" of the record of the corresponding flow on the basis of the flow characteristics included in the flow characteristic notification (step S303). The statistical information collection apparatus 40 adds "1" to the short counter when the flow characteristics included in the flow characteristic notification are the "high pps flow", and adds "1" to the long counter when the flow characteristics included in the flow characteristic notification are the "high bps flow".

Meanwhile, when it is determined that the corresponding flow is not registered in the database 50 in step S302, the statistical information collection apparatus 40 performs new registration processing of creating the record of the corresponding flow and registering the created record in the database 50 (step S304).

Subsequently, the statistical information collection apparatus 40 updates the "score" of the record of the corresponding flow (step S305).

As described above, the statistical information collection apparatus 40 adds "1" to the "counter for flow characteristics" when the flow specified by the destination information included in the flow characteristic notification is registered in the database 50, and creates the record and registers the created record in the database 50 when the corresponding flow is not registered. Thus, the first packet transfer apparatus 20 can specify the flow characteristics of the received packet while referring to the database 50.

Figure 8:
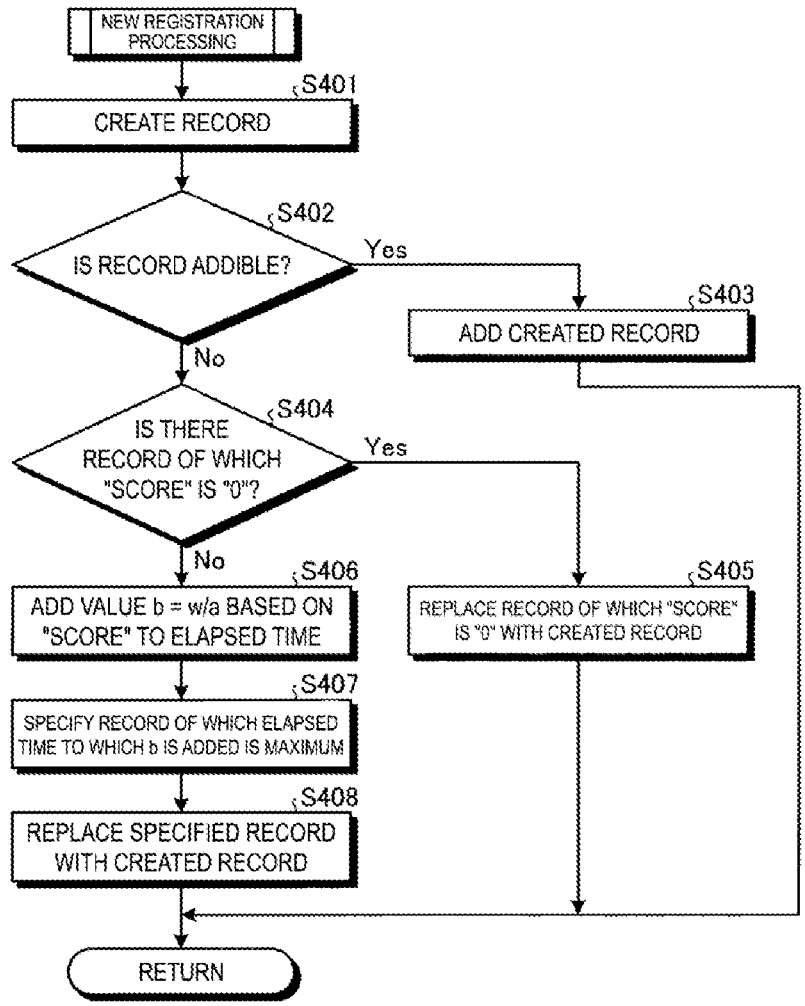
FIG. 8 is a diagram for describing an example of a flow of new registration processing.

FIG. 8 is a diagram for describing an example of a flow of the new registration processing. The statistical information collection apparatus 40 creates the record by using destination information and the flow characteristics included in the flow characteristic notification (step S401). The statistical information collection apparatus 40 sets "1" to the short counter and sets "0" to the long counter when the flow characteristics included in the flow characteristic notification are the "high pps flow", and sets "1" to the long counter and sets "0" to the short counter when the flow characteristics included in the flow characteristic notification are the "high bps flow".

Subsequently, the statistical information collection apparatus 40 determines whether the record is addible (step S402).

When the record is addible in step S402, the statistical information collection apparatus 40 adds the created record to the database 50 (step S403).

Meanwhile, when the record is not addible in step S402, the statistical information collection apparatus 40 determines whether there is the record of which the "score" is "0" (step S404).

When there is the record of which the "score" is "0" in step S404, the statistical information collection apparatus 40 replaces the record of which the "score" is "0" with the created record (step S405).

Meanwhile, when there is no record of which the "score" is "0" in step S404, the statistical information collection apparatus 40 adds a value b=w/a based on the "score" to the elapsed time for all the records (step S406). The statistical information collection apparatus 40 specifies the record of which the elapsed time to which b is added is the maximum (step S407), and replaces the specified record with the created record (step S408).

As described above, when the packet is transferred from the first packet transfer apparatus 20 to the second packet transfer apparatus 30, the load balancing system 1 according to Example 1 transfers the corresponding packet to the second packet transfer apparatus 30 in the low load state according to the flow characteristics of the flow of the corresponding packet. Accordingly, the load balancing system 1 according to Example 1 can achieve the load balancing of the second packet transfer apparatus 30. Thus, for example, in the load balancing system 1 according to Example 1, it is possible to prevent a situation in which the packet of the high bps flow is concentrated on a certain second packet transfer apparatus 30 and a situation in which the packet of the high pps flow is concentrated, and it is possible to maximize a transfer capacity of the second packet transfer apparatus 30.

The load balancing system 1 according to Example 1 stores the flow characteristic statistical information in the database 50. When the packet is received, the first packet transfer apparatus 20 determines the characteristics of the flow constituted by the received packet while referring to the database 50. Thus, the first packet transfer apparatus 20 can efficiently and accurately determine the flow characteristics.

The statistical information collection apparatus 40 updates the database 50 whenever the flow characteristic notification is received from the second packet transfer apparatus 30, and thus, the flow characteristic statistical information can be stored in the database 50.

The "counter for flow characteristics" and the "score" in association with not the 5-tuple but the destination information are stored in the database 50 for each flow, and thus, the first packet transfer apparatus 20 can efficiently determine the flow characteristics.

The statistical information collection apparatus 40 uses the record of which the "score" is "0" as a deletion target when the record of the database 50 is replaced, and selects the deletion target by the LRU by using the value obtained by adding w/a to the elapsed time when there is no record of which the "score" is "0". Thus, the first packet transfer apparatus 20 can accurately determine the flow characteristics while reducing the number of records.

Example 2

When the use of a server that transmits and receives the packet is changed over time, the flow characteristics are changed even though the destination information is the same. To cope with such a situation, in Example 2, the "counter for flow characteristics" is stored in the database 50 in a plurality of divided periods.

FIG. 9 is a diagram showing an example of the database 50 according to Example 2. As shown in FIG. 9, the "counter for flow characteristics" is divided into a counter that counts information from zero to two months ago, a counter that counts information from one to two months ago, and a counter that counts information from two to three months ago. Although the period is one month in FIG. 9, the period may be two weeks or any time unit such as two months. The "counter for flow characteristics" has a weighting factor used to calculate the "score" for each period.

The "score" is calculated as follows by using a value (A) of the short counter, a value (B) of the long counter, and a weighting factor (C) from zero to one month ago, a value (D) of the short counter, a value (E) of the long counter, and a weighting factor (F) from one to two months ago, and a value (G) of the short counter, a value (H) of the long counter, and a weighting factor (I) from two to three months ago.

"score"={(A−B)×C+(D−E)×F+(G−H)×I}/{(A+B)×C+(D+E)×F+(G+H)×I}

Note that, the "score" in a case where C=10, F=5, and I=1 is calculated in FIG. 9. For example, the "score" for the flow in which the "destination IP address" is "20.0.0.15" and the "destination port" is "443" is calculated as follows.

"score"={(1000−0)×10+(0−1000)×5+(0−1000)×1}/{(1000+0)×10+(0+1000)×5+(0+1000)×1}={10000−5000−1000}/{10000+5000+1000}=0.25

As described above, in the load balancing system 1 according to Example 2, the database 50 includes a plurality of combinations of the short counters and the long counters for each period, and the statistical information collection apparatus 40 calculates the "score" on the basis of a difference between the short counter and the long counter and a weighting factor of each combination. Thus, the first packet transfer apparatus 20 can accurately determine the flow characteristics even in a case where the flow characteristics are changed.

Hardware Configuration

Figure 10:
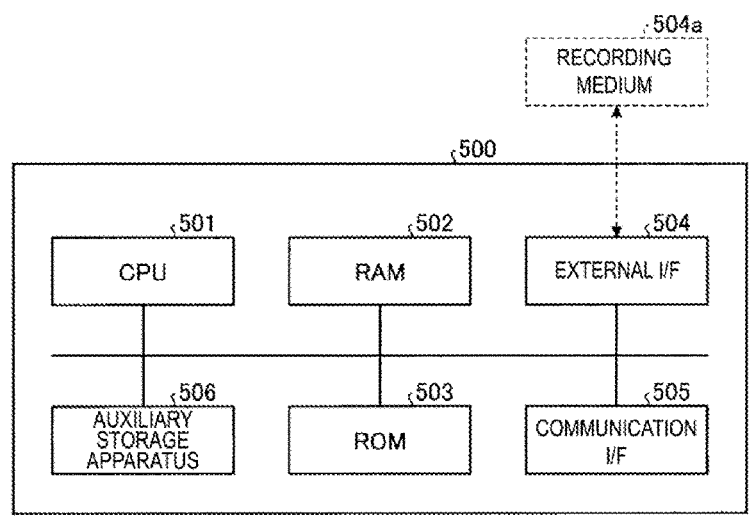
FIG. 10 is a diagram illustrating an example of a hardware configuration of a computer.

Finally, hardware configurations of the load monitoring apparatus 10, the first packet transfer apparatus 20, the second packet transfer apparatus 30, and the statistical information collection apparatus 40 according to the embodiments of the present invention will be described. The load monitoring apparatus 10, the first packet transfer apparatus 20, the second packet transfer apparatus 30, and the statistical information collection apparatus 40 according to the embodiments of the present invention are realized by using, for example, one or more computers 500 illustrated in FIG. 10. FIG. 10 is a diagram illustrating an example of the hardware configuration of the computer 500.

The computer 500 illustrated in FIG. 10 includes a central processing unit (CPU) 501, a RAM 502, a read only memory (ROM) 503, an external I/F 504, a communication I/F 505, and an auxiliary storage apparatus 506. These pieces of hardware are communicably connected to each other via a bus B.

The CPU 501 is an arithmetic apparatus that reads programs and data from the ROM 503, the auxiliary storage apparatus 506, or the like and stores the programs and data in the RAM 502; and executes processing.

The RAM 502 is a volatile semiconductor memory that temporarily stores programs and data. The ROM 503 is a non-volatile semiconductor memory that can retain programs and data even when a power is turned off. For example, an OS configuration, a network configuration, and the like are stored in the ROM 503.

The external I/F 504 is an interface with an external apparatus. The external apparatus includes a recording medium 504a. The computer 500 can read and write data from/to the recording medium 504a via the external I/F 504.

Examples of the recording medium 504a include a flexible disk, a Compact Disc (CD), a Digital Versatile Disk (DVD), a Secure Digital memory card (SD memory card), and a Universal Serial Bus (USB) memory card.

The communication I/F 505 is an interface for communicating with other apparatuses. Note that, the first packet transfer apparatus 20 and the second packet transfer apparatus 30 have a plurality of communication I/Fs 505.

The auxiliary storage apparatus 506 is, for example, a Hard Disk Drive (HDD), a Solid State Drive (SSD), or the like, and is a non-volatile storage apparatus that stores programs and data. Examples of the programs and data stored in the auxiliary storage apparatus 506 include, for example, an OS and application programs that achieve various functions on the OS.

The load monitoring apparatus 10, the first packet transfer apparatus 20, the second packet transfer apparatus 30, and the statistical information collection apparatus 40 according to the embodiments of the present invention can execute various kinds of processing described above by using one or more computers 500 illustrated in FIG. 10. Each functional unit included in the load monitoring apparatus 10 is achieved by processing obtained by the CPU 501 or the like executing one or more programs stored in the auxiliary storage apparatus 506. For example, each of the functions included in the first packet transfer apparatus 20 is achieved by processing obtained by the CPU 501 or the like executing one or more programs stored in the auxiliary storage apparatus 506, the communication I/F 505, or the like.

Note that, the load monitoring apparatus 10 may have at least one of a display apparatus such as a display or an input apparatus such as a keyboard or a mouse, for example.

The present invention is not limited to the above-described embodiment specifically disclosed, and various modifications and changes can be made without departing from the scope of the claims. For example, although it has been described in the above-described embodiment that the packet transfer apparatus that performs the load balancing is the first packet transfer apparatus 20 and the packet transfer apparatus as the load balancing target is the second packet transfer apparatus 30, the present embodiment does not mean that a certain packet transfer apparatus always functions as any of the first packet transfer apparatus 20 or the second packet transfer apparatus 30. For example, the identical packet transfer apparatus may function as the first packet transfer apparatus 20, and may also function as the second packet transfer apparatus 30.

REFERENCE SIGNS LIST

1 Load balancing system
10 Load monitoring apparatus
20 First packet transfer apparatus
30 Second packet transfer apparatus
40 Statistical information collection apparatus
50 Database
101 Flow monitoring unit
102 Load balancing decision unit
103 Command transmission unit
201 Command reception unit
202 Path table changing unit
203 Input port
204 Flow information acquisition unit
205 Application determination unit
206 Path decision unit
207 Routing unit
208 Output port
209 Input buffer
301 Statistical information recording unit
N1, N2 Network

The invention claimed is:

1. A load balancing system, comprising:
a storage medium configured to store information regarding flow characteristics indicating whether a flow constituted by one or more packets is a flow having a large number of short packets or a flow having a large number of long packets in association with destination information of the packet, wherein the information regarding the flow characteristics includes a short counter indicating a number of flows having the large number of short packets, a long counter indicating the number of flows having the large number of long packets, and a score based on a difference between the short counter and the long counter; and
one or more processors configured to:
receive a first packet at an input port;
in response to receiving the first packet at the input port, determine, on a basis of the score, flow characteristics of a first flow constituted by the first packet based on the stored information;
determine that the flow characteristics of the first flow indicate that the first flow includes the large number of short packets or the large number of long packets;
determine, from a plurality of packet transfer apparatuses, a packet transfer apparatus whose load state indicating that a load, due to a flow corresponding to the flow characteristics of the first flow, on the packet transfer apparatus is low;
output the packet received by the input port to the packet transfer apparatus;
i) select, as an entry to be replaced, an entry of which the score is 0, when there is an entry of which the score is 0; or ii) select, as the entry to be replaced, an entry that is least recently used (LRU) based on an elapsed time since each entry is registered, when there is not an entry of which the score is 0; and
replace the entry to be replaced with a new record.

2. The load balancing system according to claim 1, wherein the one or more processors are further configured to:
in a case where the packet transfer apparatus completes transfer of a flow, receive the destination information and the flow characteristics of the flow from the packet transfer apparatus, and update the storage medium.

3. The load balancing system according to claim 1, wherein the information regarding the flow characteristics includes a plurality of combinations of the short counter and the long counter for each period, and the score is a value based on the difference between the short counter and the long counter of each combination.

4. A load balancing method comprising:
storing, by a load balancing system, information regarding flow characteristics indicating whether a flow constituted by one or more packets is a flow having a larger number of short packets or a flow having a larger number of long packets in association with destination information of the packet in a storage medium, wherein the information regarding the flow characteristics includes a short counter indicating a number of flows having the large number of short packets, a long counter indicating the number of flows having the large number of long packets, and a score based on a difference between the short counter and the long counter;
receiving, by the load balancing system, a first packet at an input port;
in response to receiving the first packet at the input port, determining, by the load balancing system on a basis of the score, flow characteristics of a first flow constituted by the first packet based on the stored information;
determining, by the load balancing system, that the flow characteristics of the first flow indicate that the first flow includes the large number of short packets or the large number of long packets;
determining, by the load balancing system from a plurality of packet transfer apparatuses, a packet transfer apparatus whose load state indicating that a load, due to a flow corresponding to the flow characteristics of the first flow, on the packet transfer apparatus is low;
outputting, by the load balancing system, the packet received by the input port to the packet transfer apparatus;
i) selecting, as an entry to be replaced, an entry of which the score is 0, when there is an entry of which the score is 0; or
ii) selecting, as the entry to be replaced, an entry that is least recently used (LRU) based on an elapsed time since each entry is registered, when there is not an entry of which the score is 0; and
replacing the entry to be replaced with a new record.

5. The load balancing method according to claim 4, further comprising:
receiving, by the load balancing system, in a case where the packet transfer apparatus completes transfer of a flow, the destination information and the flow characteristics of the flow from the packet transfer apparatus; and
updating, by the load balancing system, the storage medium.

6. The load balancing method according to claim 4, wherein the information regarding the flow characteristics includes a plurality of combinations of the short counter and the long counter for each period, and the score is a value based on the difference between the short counter and the long counter of each combination.

* * * * *